Aug. 26, 1941.　　　F. W. BAUMANN　　　2,253,966
INDUCTOR FREQUENCY CHANGER
Filed Oct. 2, 1940　　　2 Sheets-Sheet 1

Inventor:
Fred W. Baumann,
by Harry E. Dunham
His Attorney.

Aug. 26, 1941.  F. W. BAUMANN  2,253,966
INDUCTOR FREQUENCY CHANGER
Filed Oct. 2, 1940  2 Sheets-Sheet 2

Inventor:
Fred W. Baumann,
by Harry E. Dunham
His Attorney.

Patented Aug. 26, 1941

2,253,966

UNITED STATES PATENT OFFICE 2,253,966

INDUCTOR FREQUENCY CHANGER

Fred W. Baumann, Scotia, N. Y., assignor to General Electric Company, a corporation of New York Application October 2, 1940, Serial No. 359,397

4 Claims. (Cl. 172—281)

My invention relates to an improved frequency changer of the self-propelled inductor type and its principal object is to increase the high frequency output of such machines by utilizing all of the flux which is available for inductor generator operation.

Figure 1:
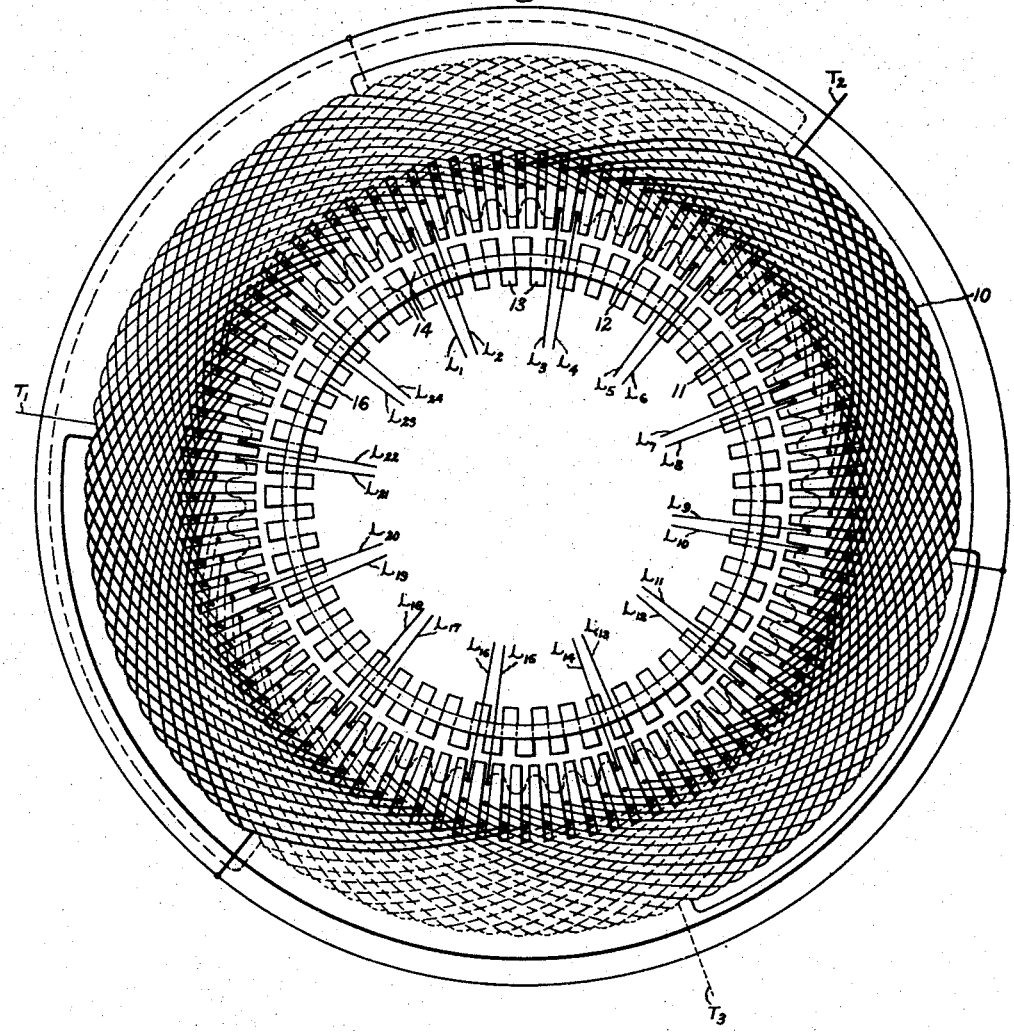
Figure 2:
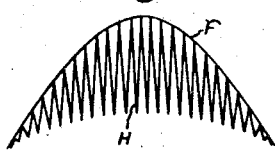
Figure 3:
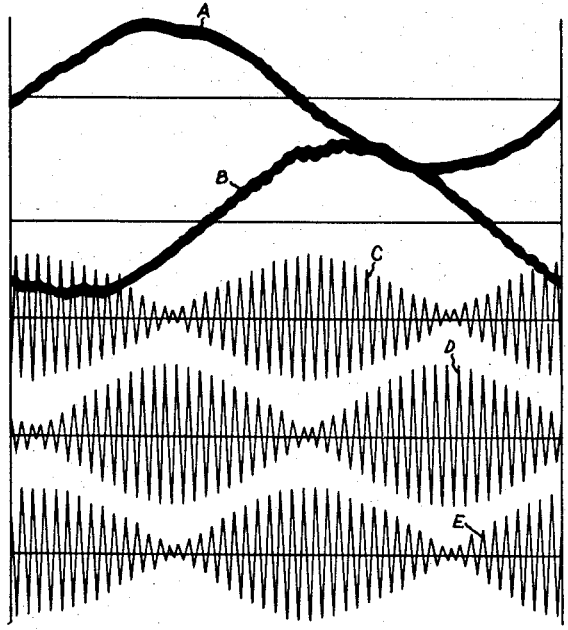
Figure 4:
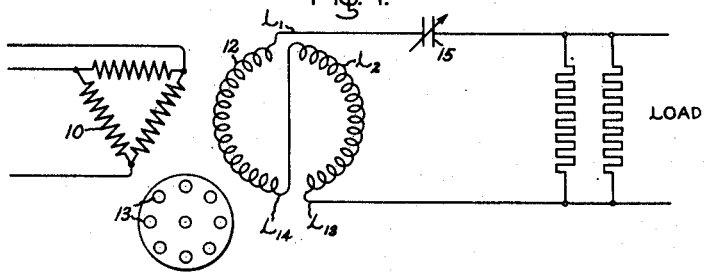
Figure 5:
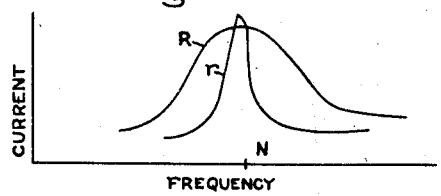

The features of my invention which are believed to be novel and patentable will be pointed out in the claims appended hereto. For a better understanding of my invention reference is made in the following description to the accompanying drawings in which Fig. 1 is an explanatory representation of my inductor frequency changer showing the stator and rotor tooth relation, the high and low frequency windings and the induction motor secondary winding. Fig. 2 is a curve representative of the fundamental and high frequency fluxes of the machine. Fig. 3 shows related high and low frequency current and voltage curves of the machine. Fig. 4 illustrates a load connection of the high frequency winding including capacitance, and Fig. 5 shows comparison resonant curves to be referred to in explaining one of the advantages of using a modulated wave high frequency output.

Referring to Fig. 1, my inductor alternator uses a stator winding 10 shown as the usual form of two-pole, three-phase distributed winding. This winding is preferably contained in the bottom of the stator slots 11 formed in the usual laminated magnetic body. The three-phase belts of the two-pole stator winding are indicated by different types of lines. Also wound in the stator slots is a high frequency winding 12 consisting of coils, one around each tooth, the coils on alternate teeth being reversed. The rotor is of the squirrel cage type having squirrel cage bars indicated at 13 in slots 14 of the laminated magnetic rotor core. 16 indicates an end ring for the squirrel cage winding. The rotor teeth are made sufficiently prominent as to cooperate with the teeth in the stator to cause good inductor generator action. The machine thus consists of an induction motor to which a high frequency stator winding has been added. The high frequency winding is practically noninductive with respect to the motor winding.

It is seen that the number of stator slots is a full multiple of the number of rotor slots and thus the relation between stator and rotor teeth is such that the permeance varies from a maximum to a minimum at all alternate stator teeth simultaneously at the same time the the permeance at the remaining stator teeth varies from a minimum to a maximum. In this instance the stator has 96 teeth and the rotor 48 teeth. The high frequency winding is shown with various terminals brought out for the purpose of explaining how it may be connected for various purposes.

It is also seen that the rotor slotting is such that the rotor has uniform or substantially uniform reluctance with respect to the fundamental or low frequency stator flux and hence there is no tendency for the rotor to run synchronously or subsynchronously at any speed.

This machine is started and runs as an induction motor, power being supplied to the three-phase winding 10 from a suitable source of supply at terminals marked $T_1$, $T_2$ and $T_3$. The winding 10 also supplies the excitation for generating high frequency current in the winding 12 and high frequency current may be taken from winding 12 in a variety of ways. For single phase, high frequency output, the outgoing leads would be connected at terminals $L_1$ and $L_{13}$ and the following terminals would be connected together in pairs: $L_2$ to $L_{14}$, $L_3$ to $L_4$, $L_5$ to $L_6$, $L_7$ to $L_8$, $L_9$ to $L_{10}$, $L_{11}$ to $L_{12}$, $L_{15}$ to $L_{16}$, $L_{17}$ to $L_{18}$, $L_{19}$ to $L_{20}$, $L_{21}$ to $L_{22}$, and $L_{23}$ to $L_{24}$. This is a series connection and is represented in Fig. 4. A parallel connection could be made by using $L_1$ and $L_2$ as one output terminal and $L_{13}$ and $L_{14}$ as the other output terminal, leaving the other connections as given above.

For a two-phase high frequency output the terminals of one phase would be $L_2$ and $L_{14}$ with pairs of terminals connected as follows: $L_3$ to $L_4$, $L_5$ to $L_6$, $L_7$ to $L_{19}$, $L_{17}$ to $L_{18}$ and $L_{15}$ to $L_{16}$. The terminals of the other phase would be $L_8$ and $L_{20}$ with pairs of terminals connected as follows: $L_1$ to $L_{13}$, $L_{24}$ to $L_{23}$, $L_{22}$ to $L_{21}$, $L_9$ to $L_{10}$ and $L_{11}$ to $L_{12}$.

For three phase high frequency output the terminals of one phase would be $L_1$ and $L_{13}$, for another phase terminals $L_{17}$ and $L_5$ and the third phase terminals would be to terminals $L_9$ and $L_{21}$. The following terminals would be connected together in pairs: $L_{22}$ to $L_{10}$, $L_{24}$ to $L_{23}$, $L_{11}$ to $L_{12}$, $L_{14}$ to $L_2$, $L_4$ to $L_3$, $L_{15}$ to $L_{16}$, $L_6$ to $L_{18}$, $L_7$ to $L_8$, and $L_{19}$ to $L_{20}$. The two and three phase connections mentioned above are series. Parallel connections analogous to those given for single phase can also be used.

From an examination of these connections of the high frequency winding it will be apparent that high frequency winding phase belts on opposite fundamental poles are reversed. The voltages generated in any series connected group of coils of the high frequency winding are in the same direction in the circuit.

In operation let the curve F, Fig. 2, represent the positive flux wave produced by the winding 10. This flux enters the rotor and drives the rotor at low slip. As the stator and rotor teeth pass each other, the flux through a given stator tooth will vary and can be represented by the curve H. Hence this is the flux that causes high frequency voltage to be generated in a high frequency coil, the frequency depending upon the speed of the rotor. The resultant A. C. component of this high frequency flux may be pictured as in one of the lower curves of Fig. 3.

Fig. 3 shows coordinated oscillograph records of an actual machine under load. Curve A is of the 60-cycle voltage applied to winding 10, curve B is the current in winding 10, curve C is the high frequency current in one phase of the high frequency winding 12 connected for two-phase operation, curve E is the voltage of the same high frequency phase, and curve D is the high frequency voltage of the other phase of winding 12.

The winding 10 of the machine produces a magnetomotive force MMF of a sine wave form $\sin \omega t$, represented by curve F, Fig. 2. However, the gap is not uniform but has a permeance P which varies as a sine wave form between the rotor teeth. Hence, the flux $\phi$ at any point in the air gap may be written $\phi = MMF \times P$. If the rotor had no slip, we could say $\phi = \sin \omega t \times \sin \omega t n$, where $n$ equals the number of rotor teeth. But since the rotor has some slip $s$ $$\phi = \sin \omega t \times \sin \omega t (1-s) n$$

This is the flux H shown in Fig. 2 which produces the voltage of Fig. 3. The modulated form of wave such as E shown in Fig. 3 is equal to the sum or difference of two sine waves of different frequency having one-half the maximum amplitude of the modulated wave and the flux equation may be expressed in terms of such sine waves thus:

$$\phi = \tfrac{1}{2} \cos(n-1-sn)\, \omega t - \tfrac{1}{2} \cos(n+1-sn)\, \omega t$$

My machine thus produces a modulated high frequency voltage wave which is the equivalent of the sum of two sine waves, one having a frequency of $(n-1-sn)f$ and the other a frequency of $(n+1-sn)f$ where $f$ is the frequency supplied to the motor winding 10, $n$ the number of rotor teeth and $s$ the slip. Such a modulated wave high frequency current is entirely suitable for many industrial purposes such for example as high frequency heating applications and greatly increases the possible output over a machine which sacrifices a large part of the available inductor generator flux for the sake of producing an unmodulated sine wave, high frequency output voltage.

In the machine illustrated in Fig. 1 the stator has twice as many teeth as the rotor. The invention is not limited to this particular toothed relationship. The necessary condition is that the teeth in one member cooperate with the teeth of the other member to produce a high frequency flux variation which is essentially in phase across a fundamental low frequency pole. Thus the ratio of stator to rotor teeth can be 2 to 1, 1 to 1, 2 to 3, 1 to 2, etc., provided the spacing between teeth is correct. Likewise the high frequency coils may be wound about groups of stator teeth instead of around individual teeth.

I have found also that the modulated frequency output is an advantage in connection with the regulation of the machine. In general it is desirable to include series capacitance 15 in the output circuit as represented in Fig. 4 and tune the high frequency load circuit to approximately unity power factor. The resonance curves of Fig. 5 represent the difference in resonance regulation with modulated and sine wave machines.

With a sine wave machine the tuning is sharp as represented by curve $r$ at normal frequency N. With a modulated frequency output as in my machine the tuning represented by curve R is not so sharp. This is a decided advantage in most heating applications.

The machine should preferably be designed for a relatively low slip not greater than 3 or 4 percent at full load. The high frequency output is of substantially constant frequency. The voltage regulation depends upon the adjustment of the series capacitor when used. The most economical design is obtained by allowing the internal reactance of the high frequency winding to be quite high and then to use series capacitance as represented in Fig. 4.

What I claim as new and desire to secure by Letters Patent of the United States, is:

1. An inductor type frequency changer comprising a dynamo-electric machine having relatively rotating members, one member having a slotted magnetic part with high and low frequency windings contained in the slots thereof and the other member comprising a magnetic member having substantially uniform reluctance with respect to the flux of the low frequency winding slotted to cooperate with the first mentioned member to produce a high frequency modulated flux, means for causing relative rotation of said members whereby when the low frequency winding is energized by alternating current a modulated high frequency voltage is induced in the high frequency winding.

2. An inductor type frequency changer comprising relatively rotatable slotted magnetic members with their slotted surfaces in concentric relation and separated by an air gap, a multipolar alternating current primary winding of fundamental frequency distributed in the slots of one of said members and a high frequency winding having a coil about each tooth or group of teeth between the slots of said member, said high frequency coils being interconnected so that high frequency winding phase belts on opposite fundamental poles are reversed, the number of slots or slot groups in one member being a full multiple of the number of slots or group of slots in the other member, means for producing relative rotation between said members to vary the permeance relation with respect to all high frequency coils between maximum and minimum values and thereby generate a high frequency voltage therein by induction action when the primary winding is excited.

3. An inductor type frequency changer comprising cooperating stator and rotor slotted magnetic members, the stator member having a fundamental frequency multi-polar distributed alternating current winding in the bottom of the stator slots and a high frequency winding in the tops of the stator slots, there being reversely wound coils of the high frequency winding about consecutive teeth or tooth groups of the slotted stator member, connections for the high frequency coils for connecting them to supply either single or polyphase loads and in series or parallel relation including connections reversing the high frequency winding phase belts on opposite fundamental poles, and a winding on the rotor member for driving the rotor when the fundamental frequency winding is energized, the slotting of the rotor being such as to have substantially uniform reluctance with respect to the fundamental flux and to vary the permeance from a maximum to a minimum at all alternate stator teeth or tooth groups simultaneously.

4. An inductor type frequency changer comprising a stator and rotor members, the stator having a slotted magnetic circuit provided with a polyphase distributed alternating current exciting winding in the bottoms of the slots and reversely wound coils around consecutive teeth, means connecting said coils to form a high frequency generating winding, the rotor member comprising a prominently uniformly slotted squirrel cage winding rotor for driving the rotor and producing induction alternator action with respect to the high frequency winding, the slotting of the rotor being such that it has substantially uniform reluctance with respect to the flux of the distributed polyphase winding and when there is a minimum permeance at alternate stator teeth or tooth groups there is a maximum permeance at the remaining stator teeth or tooth groups, said machine producing a modulated high frequency voltage at the high frequency winding terminals.

FRED W. BAUMANN.